United States Patent [19]
Miyazaki et al.

[11] Patent Number: 5,468,517
[45] Date of Patent: Nov. 21, 1995

[54] METHOD FOR TREATING SHAPED ARTICLE MADE OF POLYPROPYLENE RESIN BEFORE COATING

[75] Inventors: Katsuo Miyazaki; Takahide Maeda; Takeshi Ogawa, all of Utsunomiya; Sonoko Kakui, Chiba; Satoshi Ikeda, Yamato; Yoshiki Yamane, Tokyo, all of Japan

[73] Assignees: Nippon Paint Co., Ltd., Osaka; Honda Giken Kogyo Kabushiki Kaisha, Tokyo, both of Japan

[21] Appl. No.: 270,590

[22] Filed: Jul. 5, 1994

[30] Foreign Application Priority Data

Jul. 5, 1993 [JP] Japan ..................... 5-191690

[51] Int. Cl.$^6$ ................ B05D 3/00; B05D 3/12
[52] U.S. Cl. ............... 427/322; 252/174.14; 252/180; 427/444
[58] Field of Search ............... 252/174.14, 180; 427/322, 444

[56] References Cited

U.S. PATENT DOCUMENTS

| 4,333,771 | 6/1982 | Altenschöpfer et al. | 252/99 X |
| 4,737,314 | 4/1988 | Yokoyama et al. | 252/173 X |

FOREIGN PATENT DOCUMENTS

| 255799 | 2/1990 | Japan | C11D 3/06 |
| 2284681 | 11/1990 | Japan | B05D 7/14 |
| WO91/18046 | 11/1991 | WIPO | C08J 7/00 |

*Primary Examiner*—Michael Lusignan
*Attorney, Agent, or Firm*—Sughrue, Mion, Zinn, Macpeak & Seas

[57] ABSTRACT

There is provided a method for treating a shaped article made of a polypropylene resin before coating, comprising the step of degreasing and deterging a surface of the shaped article with an aqueous alkaline solution composed of (a) 5–50 g/liter of a builder and (b) 1–10 g/liter of an ethylene oxide adduct of aryl- or aralkyl-substituted phenol at 50°–70° C., the ethylene oxide adduct of aryl- or aralkyl-substituted phenol having a hydrophilic-lipophilic balance (HLB) of 8 to less than 12.

37 Claims, No Drawings

METHOD FOR TREATING SHAPED ARTICLE MADE OF POLYPROPYLENE RESIN BEFORE COATING

BACKGROUND OF THE INVENTION

The present invention relates to a method for treating a surface of a shaped article made of a polypropylene resin, such as a bumper for automobiles, and more particularly to a method for cleaning a surface of a shaped article made of a polypropylene resin with a detergent having a high detergency and an enhanced safety before a coating process.

A polypropylene resin has been used in a wide variety of fields due to its low weight, excellent mechanical properties, high moldability, etc. In recent years, such a polypropylene resin is also widely used as shaped articles such as bumpers for automobiles, etc., due to its excellent reusability. The bumper made of such a polypropylene resin is usually coated with a coating composition having the same color as that of a steel body of the automobile.

In this case, however, there has been a tendency that various contaminants such as a mold release agent, a mold rust-preventing agent, an operating oil (machine oil), a conveyor oil, oily dirt from human hands, etc. are attached to a surface of the bumper during its manufacturing processes. This leads to such problems that a coating composition suffers from crawling on the contaminated surface of the bumper, and that the resulting coating tends to peel off therefrom.

Under these circumstances, the bumper has been usually subjected to a pretreatment to remove the contaminants from the surface thereof by using an organic solvent. A typical organic solvent used for such a purpose includes trichloroethane. Although trichloroethane is capable of dissolving oily contaminants and therefore exhibits a high detergency, it causes air pollution problems such as destroying an ozone layer and a water pollution. On these grounds, it is expected that the use of trichloroethane is legally banned in the near future. Other organic solvents used include aromatic compounds such as toluene, kerosene, gasoline, petroleum benzine, isopropyl alcohol, etc. However, these petroleum-type solvents or alcohol-type solvents disadvantageously show a high volatility and a high flammability.

As a result, there has been recently proposed a method in which an aqueous detergent such as a surface-active agent, an acidic degreasing and deterging agent, etc., which does not suffer from the above-mentioned problems, is used to remove oily contaminants from the surface of the bumper. However, conventional aqueous detergents do not have sufficient effects on a wide range of contaminants including various organic or inorganic substances.

There has been an increased demand to develop methods in which an aqueous detergent with high detergency for various contaminants is used without suffering from the above-mentioned problems. For example, Japanese Patent Laid-Open No. 2-284681 discloses a degreasing and deterging method in which coarse alkali salts and a white kerosene are used in a degreasing and deterging agent. This degreasing and deterging method still causes the above-mentioned problems because the degreasing and deterging agent contains white kerosene.

Japanese Patent Laid-open No. 2-55799 discloses a detergent which comprises an alkali primarily in the form of a potassium salt or an acid primarily in the form of a phosphoric acid or a phosphoric acid salt, polyethylene glycol, a nonionic surface-active agent (HLB: 12–18) and a defoaming agent. This detergent is likely to generate a nutrition-rich effluent because phosphorus and nitrogen are contained therein. Though the detergent contains a sodium salt or a potassium salt of phosphoric acid as an alkali builder, its detergency is poor because this alkali builder has considerably high saponification degree and dispersibility. Though the detergent also contains a phosphoric compound as an acid builder, a sufficient detergency is not obtained as well, since such an acid builder has poor saponification.

WO 9118046 discloses a two-step process comprising a cleaning step with an alkali and a cleaning step with an acid. However, this process requires a long period of time, resulting in increased cost.

OBJECT AND SUMMARY OF THE INVENTION

Accordingly, an object of the present invention is to provide a method for treating a surface of a shaped article made of a polypropylene resin in a short period of time with a detergent having a high safety and a high detergency before a coating process.

As a result of intense research in view of the above object, the inventors have found that when an aqueous solution comprising sodium carbonate and an ethylene oxide adduct of an aryl- or aralkyl-substituted phenol in particular proportions is used as a detergent, a shaped article made of a polypropylene resin can be well degreased and deterged at a high safety. Further, it has been found that the shaped article thus treated is excellent in adhesion of a top coat, a gasoline resistance, etc. The present invention has been completed based on the above findings.

Thus, there is provided according to the present invention a method for treating a surface of a shaped article made of a polypropylene resin before a coating process, comprising the step of degreasing and deterging the surface of the shaped article with an aqueous alkaline solution at a temperature ranging from 50° C. to 70° C., the aqueous alkaline solution comprising:

(a) 5–50 g/liter of a builder; and (b) 1–10 g/liter of an ethylene oxide adduct of an aryl- or aralkyl-substituted phenol having a hydrophilic-lipophilic balance (HLB) of 8 to less than 12.

DETAILED DESCRIPTION OF THE PREFERRED EMBODIMENTS

The present invention will be explained in detail below.

[A] Polypropylene resin and shaped article made thereof

Polypropylene resins forming a shaped article may include any polymers obtained from propylene as a primary monomer. Such polymers include a propylene homopolymer, a propylene copolymer such as a block copolymer or a random copolymer of propylene and other $\alpha$-olefins, etc. Generally, a propylene/ethylene block copolymer and a propylene/ethylene random copolymer are suitably utilized.

The polypropylene resin may also contain other polyolefins, thermoplastic elastomers and various fillers. For instance, the polypropylene resin may include polyethylene, an ethylene-propylene copolymer rubber (EPR), an ethylene-propylene-diene copolymer rubber (EPDM), an ethylene-butene copolymer rubber (EBR), an inorganic filler such as talc, etc.

The shaped article made of the polypropylene resin, to which the method of the present invention is applied, may be manufactured by a blow-molding method, an injection-molding method, etc.

[B] Compositions of treating agents

The method for treating a surface of a shaped article made of a polypropylene resin before a coating process according to the present invention includes a degreasing and deterging process, and if necessary a surface-conditioning process. A detergent (1) used in the degreasing and deterging process is composed of (i) a builder and (ii) a surface-active agent as essential components, and if necessary, (iii) a water-softening agent. In the surface-conditioning process adapted to shorten a processing time, an aqueous solution containing a surface-conditioning agent (2) is employed. The treating agents used will be explained below.

(1) Degreasing and deterging agent (simply called "detergent")

(i) Builder

A builder used in the method of the present invention is an alkali builder such as sodium carbonate. The alkali builder exhibits excellent deterging effects, particularly in the case of removal of a mold release agent made of a vegetable oil, in combination with a surface-active agent described in detail hereinafter. Since the detergent used in the method of the present invention contains no phosphorus and nitrogen, it is not necessary to take a measure to prevent a nutrition-rich condition of an effluent.

(ii) Surface-active agent

A surface-active agent used in the method of the present invention is an ethylene oxide adduct of aryl- or aralkyl-substituted phenol, which is a nonionic surface-active agent. Suitable aryl groups in the aryl-substituted phenols include phenyl, tolyl, xylyl, biphenyl, naphthyl, anthryl, etc. Among them, phenyl, tolyl and xylyl groups are preferable. Suitable aralkyl groups in the aralkyl-substituted phenols include phenylmethyl, phenylethyl, phenylpropyl, phenylbutyl, phenylpentyl, etc. Among them, phenylmethyl, phenylethyl and phenylpropyl groups are preferable.

Since the ethylene oxide adduct of aryl- or aralkyl-substituted phenol has a hydrophilic group of a multi-nucleus phenol-type, it is especially excellent in deterging effect on oils and fats. The ethylene oxide adduct of aryl- or aralkyl-substituted phenol is preferably in the form of an ether such as polyoxyethylene phenol ether, more preferably expressed by the following formula:

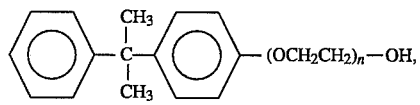

wherein n is 3–8.

A hydrophilic-lipophilic balance (hereinafter referred to as "HLB") of the ethylene oxide adduct of aryl- or aralkyl-substituted phenol is in the range of from 8 to less than 12. When the HLB is less than 8 or 12 or more, the ethylene oxide adduct of aryl- or aralkyl-substituted phenol shows poor detergency. A preferred HLB of the ethylene oxide adduct of aryl- or aralkyl-substituted phenol is in the range of from 9 to 11.

A molecular weight of the ethylene oxide adduct of aryl- or aralkyl-substituted phenol is preferably in the range of from 300 to 1,000, more preferably 350 to 600.

(iii) Water-softening agent

When a ground water containing $Ca^{2+}$ and $Mg^{2+}$ in a relatively large amount is used as a solvent for the detergent according to the invention, the detergent shows a considerably low detergency. In such a case, a water-softening agent is preferably added to the detergent. Suitable water-softening agents include alkali metal salts of carboxylic acid polymers. The alkali metal salt of carboxylic acid polymer is capable of effectively chelating $Ca^{2+}$ and $Mg^{2+}$ contained in the water and converts such a hard water to a soft water. Since the water-softening agent contains no phosphorus and nitrogen, it is not required to take a measure to prevent a nutrition-rich condition of an effluent.

Carboxylic acid polymers used in the alkali metal salts include homopolymers of carboxylic acids or copolymers of 2 or more kinds of carboxylic acids. Preferred carboxylic acids are, for example, monocarboxylic acids such as acrylic acid and methacrylic acid, dicarboxylic acids such as maleic acid, fumaric acid and itaconic acid, etc. The carboxylic acid polymer may be a copolymer of at least two carboxylic acids, and a particularly preferred combination is acrylic acid and maleic acid. Suitable alkali metal salts include sodium salts, potassium salts, etc. Among them, a sodium salts are preferred.

A molecular weight of the alkali metal salt of a carboxylic acid polymer is preferably in the range of from 50,000 to 100,000, more preferably in the range of from 60,000 to 80,000.

(2) Surface-conditioning agent

In the method for treating the surface of the shaped article before a coating process, to enhance a dryability (water removability) of the treated article and to shorten a processing time, the shaped article may be further subjected to a surface-conditioning process after the degreasing and deterging process. Suitable surface-conditioning agents used in the surface-conditioning process include aqueous solutions of polyoxyethylene-higher alcohols. When the surface of the shaped article made of a polypropylene resin is treated with the aqueous solution of polyoxyethylene-higher alcohol as a surface-conditioning agent, a water wettability and water removability (dryability) thereof is considerably enhanced. In addition, since these surface-conditioning effects can be obtained even when a small amount of the surface-conditioning agent is used, the treatment by the surface-conditioning agent is inexpensive.

The aqueous solution of polyoxyethylene-higher alcohol as a surface-conditioning agent has an HLB of 12–16. When the HLB is less than 12, a water-wettability of the treated surface is insufficient. On the other hand, when the HLB value exceeds 16, no further improvement in the surface water wettability is obtained. Therefore, the preferred HLB is in the range of from 12 to 14.

The term "HLB" used herein means a hydrophilic-lipophilic balance, which represents a hydrophilic property of a surface-active agent and is expressed by the following formula:

$$HLB = \text{(molecular weight of hydrophilic moiety/molecular weight of surface-active agent)} \times (100/5)$$
$$= \{\text{weight of hydrophilic group/(weight of hydrophobic group + weight of hydrophilic group)}\} \times (100/5).$$

In a case where the surface-conditioning agent contains no hydrophilic group, the HLB value is zero.

Polyoxyethylene-higher alcohol used as the surface-conditioning agent in the method of the present invention may be an adduct of 5–8 moles of ethylene oxide and one mole of higher alcohol having 10–18 carbon atoms such as lauryl alcohol, oleyl alcohol, sperm alcohol, etc. Preferred polyoxyethylene-higher alcohol is a secondary, linear alcohol ethoxylate.

[C] Proportions of components (1) Degreasing and deterging agent (detergent)

(a) Builder

The proportion of the builder in the detergent is in the range of from 5 g/liter to 50 g/liter, preferably from 10 g/liter to 20 g/liter. When the proportion of the builder is less than 5 g/liter, the detergent has a poor detergency. On the other hand, when the proportion of the builder exceeds 50 g/liter, no further improvement in the detergency is obtained, resulting in economic disadvantages.

(b) Ethylene oxide adduct of aryl- or aralkyl-substituted phenol

The proportion of the ethylene oxide adduct of aryl- or aralkyl-substituted phenol in the detergent is in the range of from 1 g/liter to 10 g/liter, preferably from 3 g/liter to 6 g/liter. When the proportion of the adduct is less than 1 g/liter, the detergent has a poor detergency and a low film adhesion. On the other hand, even when the proportion of the adduct exceeds 10 g/liter, no further improvement in the detergency is obtained, resulting in economic disadvantages.

(c) Alkali metal salt of carboxylic acid polymer

The proportion of the alkali metal salt of a carboxylic acid polymer in the detergent is in the range of from 0 to 5 g/liter. In a case where a hard water is used as a solvent, the proportion of the alkali metal salt of a carboxylic acid polymer is preferably in the range of from 0.5 g/liter to 5 g/liter. In such a case, when the proportion of the alkali metal salt of carboxylic acid polymer is less than 0.5 g/liter, a water-softening effect of the detergent is poor so that a sufficient detergency is not obtained. When the proportion of the alkali metal salt of carboxylic acid polymer exceeds 5 g/liter, no further improvement in detergency is expected, resulting in economic disadvantages.

(2) Surface-conditioning agent

In a case where a surface-conditioning process is used, the proportion of polyoxyethylene-higher alcohol in the surface-conditioning agent used is in the range of from 0.1 g/liter to 5 g/liter, preferably from 0.5 g/liter to 2.5 g/liter. When the proportion of the polyoxyethylene-higher alcohol is less than 0.1 g/liter, a surface tension on the resin treated cannot be sufficiently reduced, leading to poor surface water weltability. On the other hand, when the proportion of the polyoxyethylene-higher alcohol exceeds 5 g/liter, no further improvement in surface water weltability can be obtained.

[D] Pretreatment method (1) Degreasing and deterging process

The detergent thus prepared is used to degrease and deterge the surface of the shaped article made of a polypropylene resin. A method used for the degreasing and deterging process includes a spray method, etc. In the case of the spray method, a spraying time is preferably in the range of from 30 seconds to 90 seconds and a spraying pressure is preferably in the range of from 1 $kg/cm^2$ to 5 $kg/cm^2$.

The detergent is used at a temperature ranging from 50° C. to 70° C. When the temperature is less than 50° C., a sufficient detergency is not obtained. On the other hand, when the temperature exceeds 70° C., no further improvement in detergency is obtained, resulting in economic disadvantages.

After completion of the degreasing and deterging process by the detergent, the surface of the shaped article treated is preferably washed with a tap water, an industrial water, a ground water, etc. and thereafter washed with a pure water from the economic point of view.

(2) Surface-conditioning process

Subsequent to the degreasing and deterging process, the surface of the shaped article treated may be subjected to a surface-conditioning process to enhance a water removability (dryability) thereof, if desired. In this case, a method used for the surface-conditioning process may be a spraying method, etc. In a case where the spraying method is used for the surface-conditioning process, the spraying time is preferably in the range of from 10 seconds to 30 seconds and a spraying pressure is preferably in the range of from 0.3 $kg/cm^2$ to 0.8 $kg/cm^2$.

The surface-conditioning agent is preferably at 5° C. to 60° C., more preferably at 30° C. to 60° C. When the temperature is lower than 5° C., water droplets attached to the surface of the shaped article are not sufficiently removed by drying. On the other hand, when the temperature of the surface-conditioning agent exceeds 70° C., no further improvement in dryability is obtained, resulting in economic disadvantages.

After completion of the treatment by the surface-conditioning agent, water droplets remaining on the surface of the shaped article are preferably removed by an air-blowing method, etc. before a drying process. This leads to considerable reduction of a drying time. The drying of the shaped article is preferably conducted at a temperature of 70° C. to 80° C. and for 5 minutes to 10 minutes.

The shaped article thus treated may be coated with an adequate primer and then a desired coating composition. The coated shaped article such as a bumper of an automobile is usually further coated with a primer and if desired, a top-coat composition before it is mounted to a vehicle body, etc.

The pretreating method of the present invention has such advantages that a treating time can be considerably reduced, that a life of the treating bath can be increased due to an enhanced detergency against various contaminants, and that high film adhesion and blister resistance of the applied coats are obtained. Further, there exist no problems such as flammability, environmental pollution, etc. due to the fact that the detergent and the surface-conditioning agent do not contain an organic solvent. Furthermore, since the detergent and the surface-conditioning agent do not contain phosphorus and nitrogen, it is not necessary to take a measure for preventing a nutrition-rich condition of an effluent.

Incidentally, each term used in the specification with respect to "builder," "HLB (hydrophilic-lipophilic balance)," "multi-nucleus phenol," "carboxylic acid polymer," "detergent (degreasing and deterging agent)," "surface-conditioning agent," etc. is merely one of nomenclatures usable therefor and other terms may be utilized instead. For instance, "multi-nucleus phenol" may be indicated by other terms representing a phenol having 2 or more aromatic rings such as benzene rings, and "carboxylic acid polymer" may be indicated by other terms representing a polymer of carboxylic acid.

The present invention will be described in detail by way of Examples without intention of restricting the scope of the present invention.

EXAMPLES 1–18

Each shaped article was prepared as a sample from a resin composition composed primarily of a propylene-ethylene block copolymer. Contaminants (1)–(5) shown below were applied in an amount of 2 $g/m^2$ to the sample surfaces. Particularly, the contaminant (5) including oily dirt from human hands, sweat, etc. was applied to the sample surfaces in such an amount that it could be observed by the naked eye.

Contaminants Applied (1) Vegetable oil (mold release agent for polypropylene molding) (CERAPAC #100S manufactured by K.K. Yamaichi Kagaku Kogyo).

(2) Mold rust inhibitor for polypropylene molding (AUTOGUARD AV8010 manufactured by K.K. Sannou Kasei).

(3) Machine oil for a polypropylene-molding apparatus (TERRACE 46 manufactured by Shell).

(4) Conveyor oil (OMARA C-150 manufactured by Shell Corp.) dropped from a conveyor.

(5) Oily dirt, sweat, etc. from operators' hands.

Next, sodium carbonate and an ethylene oxide adduct of aralkyl-substituted phenol having the following formula:

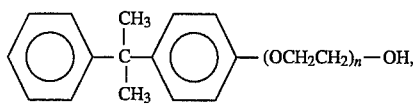

wherein n represents the number of moles of ethylene oxide added, were added to water to prepare detergents. The proportions of the components are shown in Table 1 together with the number of moles of ethylene oxide and the HLB values of the ethylene oxide adducts of aralkyl-substituted phenol.

The detergents thus prepared were sprayed to a surface of each sample at a spraying pressure of 1.5 kg/cm$^2$ for 60 seconds. The temperatures of the detergents are also shown in Table 1.

After deterging, each sample was sprayed with a tap water at 20° C. and at a spraying pressure of 1.5 kg/cm$^2$ for 30 seconds and then with a pure water at 20° C. and at a spraying pressure of 1.0 kg/cm$^2$ for 20 seconds to wash out the detergent from the surface of the sample. The samples were dried by spraying air at 20° C. and at a spraying pressure of 4 kg/cm$^2$ for 20 seconds.

The samples thus treated were then coated with an aqueous primer composed of a polyolefin resin at a dry thickness of 8–12 μm in Examples 1–9 and with an organic solvent-type primer composed of a polyolefin resin at a dry thickness of 7–12 μm in Examples 10–18. The primers were baked at a temperature of 80° C. for 10 minutes.

TABLE 1

| Exam. No. | Na$_2$CO$_3$ (g/l) | Adduct[1] Content[2] | EO[3] | HLB | Temp. (°C.) | Primer Type |
|---|---|---|---|---|---|---|
| 1 | 14 | 4 | 5 | 9.8 | 60 | Aqueous |
| 2 | 5 | 4 | 5 | 9.8 | 60 | Aqueous |
| 3 | 50 | 4 | 5 | 9.8 | 60 | Aqueous |
| 4 | 14 | 1 | 5 | 9.8 | 50 | Aqueous |
| 5 | 14 | 10 | 5 | 9.8 | 70 | Aqueous |
| 6 | 14 | 4 | 6 | 11.1 | 60 | Aqueous |
| 7 | 14 | 1.5 | 7 | 11.8 | 60 | Aqueous |
| 8 | 14 | 4 | 5 | 9.8 | 50 | Aqueous |
| 9 | 14 | 4 | 5 | 9.8 | 70 | Aqueous |
| 10 | 14 | 4 | 5 | 9.8 | 60 | Organic Solvent |
| 11 | 5 | 4 | 5 | 9.8 | 60 | Organic Solvent |
| 12 | 50 | 4 | 5 | 9.8 | 60 | Organic Solvent |
| 13 | 14 | 1 | 5 | 9.8 | 50 | Organic Solvent |
| 14 | 14 | 10 | 5 | 9.8 | 70 | Organic Solvent |
| 15 | 14 | 4 | 6 | 11.1 | 60 | Organic Solvent |
| 16 | 14 | 1.5 | 7 | 11.8 | 60 | Organic Solvent |
| 17 | 14 | 4 | 5 | 9.8 | 50 | Organic Solvent |
| 18 | 14 | 4 | 5 | 9.8 | 70 | Organic Solvent |

Note:
[1]Adduct of aralkyl-substituted phenol and ethylene oxide.
[2]Content of adduct (unit: g/liter).
[3]Ethylene oxide (unit: mol).

After coating of the primer, the samples were coated with a base coat (R212 manufactured by Nippon BEE Chemical Co., Ltd.) at a dry thickness of 15–20 μm and with a clear coat (R288 manufactured by Nippon BEE Chemical Co., Ltd.) at a dry thickness of 30–35 μm by a wet-on-wet method. The resulting coats were baked at 80° C. for 30 minutes.

EXAMPLES 19–36

Examples 1 and 14 were repeated except for using detergents containing sodium carbonate, an ethylene oxide adduct of aralkyl-substituted phenol having the following formula:

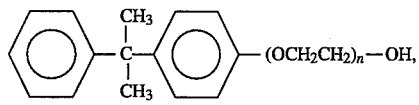

wherein n represents the number of moles of ethylene oxide added, and a sodium salt of a maleic acid/acrylic acid copolymer (molecular weight: about 70,000) as a water-softening agent. After the completion of the degreasing and deterging process, a surface-conditioning process was further performed by using an aqueous solution of polyoxyethylene-secondary alcohol (polyoxyethylene adduct of lauryl alcohol). The content of the polyoxyethylene-secondary alcohol, the number of moles of ethylene oxide added to the secondary alcohol, the HLB values of the polyoxyethylene-secondary alcohol and the temperature of the surface-conditioning agent are shown together with the data of the detergents in Table 2.

TABLE 2

| Exam. No. | Na$_2$CO$_3$ (g/l) | Adduct[1] Content[3] | EO[4] | HLB | Salt[2] (g/l) | Temp. (°C.) |
|---|---|---|---|---|---|---|
| 19 | 14 | 4 | 5 | 9.8 | 2 | 60 |
| 20 | 14 | 4 | 5 | 9.8 | 0.5 | 60 |
| 21 | 14 | 4 | 5 | 9.8 | 5 | 60 |
| 22 | 14 | 4 | 5 | 9.8 | 2 | 60 |
| 23 | 14 | 4 | 5 | 9.8 | 2 | 60 |
| 24 | 14 | 4 | 5 | 9.8 | 2 | 60 |
| 25 | 14 | 4 | 5 | 9.8 | 2 | 60 |
| 26 | 14 | 4 | 5 | 9.8 | 0 | 60 |
| 27 | 14 | 4 | 5 | 9.8 | 2 | 60 |
| 28 | 14 | 4 | 5 | 9.8 | 2 | 60 |
| 29 | 14 | 4 | 5 | 9.8 | 0.5 | 60 |

TABLE 2-continued

| | | | | | | |
|---|---|---|---|---|---|---|
| 30 | 14 | 4 | 5 | 9.8 | 5 | 60 |
| 31 | 14 | 4 | 5 | 9.8 | 2 | 60 |
| 32 | 14 | 4 | 5 | 9.8 | 2 | 60 |
| 33 | 14 | 4 | 5 | 9.8 | 2 | 60 |
| 34 | 14 | 4 | 5 | 9.8 | 2 | 60 |
| 35 | 14 | 4 | 5 | 9.8 | 0 | 60 |
| 36 | .14 | 4 | 5 | 9.8 | 2 | 60 |

Note:
[1] Adduct of aralkyl-substituted phenol and ethylene oxide.
[2] Sodium salt of a maleic acid/acrylic acid copolymer.
[3] Content of adduct (unit: g/liter).
[4] Ethylene oxide (unit: mol).

Surface-Conditioning, Agent

| Exam. No. | Polyoxyethylene-sec. Alcohol | | | Temp. (°C.) | Primer Type |
|---|---|---|---|---|---|
| | Content[1] | EO[2] | HLB | | |
| 19 | 1.5 | 7 | 12.1 | 20 | Aqueous |
| 20 | 1.5 | 7 | 12.1 | 20 | Aqueous |
| 21 | 1.5 | 7 | 12.1 | 20 | Aqueous |
| 22 | 0.1 | 7 | 12.1 | 20 | Aqueous |
| 23 | 5 | 7 | 12.1 | 20 | Aqueous |
| 24 | 1.5 | 7 | 12.1 | 5 | Aqueous |
| 25 | 1.5 | 7 | 12.1 | 50 | Aqueous |
| 26 | 1.5 | 7 | 12.1 | 20 | Aqueous |
| 27 | — | — | — | — | Aqueous |
| 28 | 1.5 | 7 | 12.1 | 20 | Organic Solvent |
| 29 | 1.5 | 7 | 12.1 | 20 | Organic Solvent |
| 30 | 1.5 | 7 | 12.1 | 20 | Organic Solvent |
| 31 | 0.1 | 7 | 12.1 | 20 | Organic Solvent |
| 32 | 5 | 7 | 12.1 | 20 | Organic Solvent |
| 33 | 1.5 | 7 | 12.1 | 5 | Organic Solvent |
| 34 | 1.5 | 7 | 12.1 | 50 | Organic Solvent |
| 35 | 1.5 | 7 | 12.1 | 20 | Organic Solvent |
| 36 | — | — | — | — | Organic Solvent |

Note:
[1] Content of surface-conditioning agent (unit: g/liter).
[2] Ethylene oxide (unit: mol).

After the degreasing and deterging process, the surface-conditioning agent was sprayed to the samples at a spraying pressure of 0.5 kg/cm² for 20 seconds. The temperature of the surface-conditioning agents used are also shown in Table 2. After the treatment by the surface-conditioning agent, the samples were blown by air at 20° C. and at a blowing pressure of 4 kg/cm² for 20 seconds and then dried at a temperature of 80 ° C. for 5 minutes.

The samples thus treated were then coated with an aqueous primer composed of a polyolefin resin at a dry thickness of 8–12 μm in Examples 19–27 and with an organic solvent-type primer composed of a polyolefin resin at a dry thickness of 7–12 μm in Examples 28–36. The primers were baked at a temperature of 80° C. for 10 minutes.

After coating of the primer, the samples were coated with the same base coat and the same clear coat as in Examples 1–18. The resulting coats were baked at 80° C. for 30 minutes.

Comparative Examples 1–12

For the purpose of comparison, samples were treated with detergents shown in Table 3 in the same manner as in Examples 1–18.

The samples thus treated were then coated with an aqueous primer composed of a polyolefin resin at a dry thickness of 8–12 μm in Comparative Examples 1–6 and with an organic solvent-type primer composed of a polyolefin resin at a dry thickness of 7–12 μm in Comparative Examples 7–12. The primers were baked at a temperature of 80° C. for 10 minutes.

After coating of the primer, the samples were coated with the same base coat and the same clear coat as in Examples 1–18. The resulting coats were baked at 80° C. for 30 minutes.

TABLE 3

| Exam. No. | Na₂CO₃ (g/l) | Detergent | | | Temp. (°C.) | Primer Type |
|---|---|---|---|---|---|---|
| | | Adduct[1] | | | | |
| | | Content[2] | EO[3] | HLB | | |
| 1 | 1 | 4 | 5 | 9.8 | 60 | Aqueous |
| 2 | 100 | 4 | 5 | 9.8 | 60 | Aqueous |
| 3 | 14 | 0.5 | 5 | 9.8 | 60 | Aqueous |
| 4 | 14 | 20 | 5 | 9.8 | 60 | Aqueous |
| 5 | 14 | 4 | 5 | 9.8 | 30 | Aqueous |
| 6 | 14 | 4 | 5 | 9.8 | 90 | Aqueous |
| 7 | 1 | 4 | 5 | 9.8 | 60 | Organic Solvent |
| 8 | 100 | 4 | 5 | 9.8 | 60 | Organic Solvent |
| 9 | 14 | 0.5 | 5 | 9.8 | 60 | Organic Solvent |
| 10 | 14 | 20 | 5 | 9.8 | 60 | Organic Solvent |
| 11 | 14 | 4 | 5 | 9.8 | 30 | Organic Solvent |
| 12 | 14 | 4 | 5 | 9.8 | 90 | Organic Solvent |

Note:
[1] Adduct of aralkyl-substituted phenol and ethylene oxide.
[2] Content of adduct (unit: g/liter).
[3] Ethylene oxide (unit: mol).

The samples thus coated in Examples 1–36 and Comparative Examples 1–12 were evaluated with respect to film adhesion, water soak film adhesion, appearance and a gasoline resistance according to the evaluation methods described below. The evaluation results are shown in Table 4.

EVALUATION METHOD (a) Film Adhesion

Each coated surface of the sample was cut by a razor to form a checkerboard pattern of 10×10=100 at a 2-mm interval, and a cellophane tape (manufactured by Nichiban CO., LTD.) was adhered to the cut surface. After the cellophane tape was peeled off from the cut surface, the number of remaining segments of the checkerboard pattern were counted. The results are shown in Table 4.

(b) Water Soak Film Adhesion 24 hours after forming the coats, the samples were immersed in a deionized water at 40° C. for 10 days. 24 hours after the samples were removed from the deionized water, the samples were subjected to the same adhesion test as in (a) above. After the adhesion test, the number of the remaining segments of the checkerboard pattern was counted. The sample surfaces were observed by the naked eye to ascertain whether or not blisters were created in the coats. When the blisters were observed, the samples are marked by "B" in Table 4.

(c) Appearance

After the samples were subjected to degreasing and deterging, water-washing, surface-conditioning and air-blowing processes, the contaminants remaining on the sample surfaces were observed by the naked eye. The observation results classified into 3 groups below are shown in Table 4.

◯: 0% remaining,
△: less than 50% remaining, and
X: 50% or more remaining.

(d) Gasoline Resistance

After coating, the samples were immersed in a mixture of 10 weight % of ethanol and 90 weight % of a regular gasoline at 20° C. for 30 minutes. The appearance of the coated sample surfaces was observed by the naked eye. The observation results classified as follows are shown in Table 4.

◯: No abnormal appearance
X: Blisters were observed in the coatings.

TABLE 4

| Exam. No. | Contaminant | Film Adhesion | Water Soak Film Adhesion | Appearance | Gasoline Resistance |
|---|---|---|---|---|---|
| 1 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 2 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 3 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 4 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 5 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 6 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 7 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 8 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 9 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 10 | (1) | 100 | 100 | ◯ | ◯ |
| 11 | (1) | 100 | 100 | ◯ | ◯ |
| 12 | (1) | 100 | 100 | ◯ | ◯ |
| 13 | (1) | 100 | 100 | ◯ | ◯ |
| 14 | (1) | 100 | 100 | ◯ | ◯ |
| 15 | (1) | 100 | 100 | ◯ | ◯ |
| 16 | (1) | 100 | 100 | ◯ | ◯ |
| 17 | (1) | 100 | 100 | ◯ | ◯ |
| 18 | (1) | 100 | 100 | ◯ | ◯ |
| 19 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 20 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 21 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 22 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 23 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 24 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 25 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 26 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 27 | (1) | 100 | 100 | ◯ | ◯ |
|  | (2) | 100 | 100 | ◯ | ◯ |
|  | (3) | 100 | 100 | ◯ | ◯ |
|  | (4) | 100 | 100 | ◯ | ◯ |
|  | (5) | 100 | 100 | ◯ | ◯ |
| 28 | (1) | 100 | 100 | ◯ | ◯ |
| 29 | (1) | 100 | 100 | ◯ | ◯ |
| 30 | (1) | 100 | 100 | ◯ | ◯ |
| 31 | (1) | 100 | 100 | ◯ | ◯ |
| 32 | (1) | 100 | 100 | ◯ | ◯ |
| 33 | (1) | 100 | 100 | ◯ | ◯ |
| 34 | (1) | 100 | 100 | ◯ | ◯ |
| 35 | (1) | 100 | 100 | ◯ | ◯ |
| 36 | (1) | 100 | 100 | ◯ | ◯ |
| Com. Exam. No. | | | | | |
| 1 | (1) | 80 | 50 | △ | X |
|  | (2) | 90 | 85 | ◯ | X |
|  | (3) | 90 | 85 | ◯ | X |
|  | (4) | 90 | 80 | △ | X |
|  | (5) | 100 | 100 | ◯ | ◯ |
| 2 | (1) | 100 | 100B[6] | ◯ | X |
|  | (2) | 100 | 100B | ◯ | X |
|  | (3) | 100 | 100B | ◯ | X |
|  | (4) | 100 | 100B | ◯ | X |

TABLE 4-continued

| | Contaminant | Film Adhesion | Water Soak Film Adhesion | Appearance | Gasoline Resistance |
|---|---|---|---|---|---|
| | (5) | 100 | 100B | ○ | ○ |
| 3 | (1) | 100 | 100 | ○ | ○ |
| | (2) | 80 | 65 | △ | X |
| | (3) | 75 | 60 | △ | X |
| | (4) | 30 | 20 | X | X |
| | (5) | 100 | 100 | ○ | ○ |
| 4 | (1) | 80 | 75 | △ | X |
| | (2) | 80 | 70 | △ | X |
| | (3) | 60 | 40 | X | X |
| | (4) | 50 | 20 | X | X |
| | (5) | 100 | 100 | ○ | ○ |
| 5 | (1) | 80 | 70 | △ | X |
| | (2) | 70 | 65 | X | X |
| | (3) | 70 | 65 | X | X |
| | (4) | 60 | 45 | X | X |
| | (5) | 90 | 85 | △ | X |
| 6 | (1) | 100 | 100 | ○ | ○ |
| | (2) | 100 | 100 | ○ | ○ |
| | (3) | 100 | 100 | ○ | ○ |
| | (4) | 100 | 95 | △ | ○ |
| | (5) | 100 | 100 | ○ | ○ |
| 7 | (1) | 85 | 65 | △ | X |
| 8 | (1) | 100 | 100B[6] | ○ | X |
| 9 | (1) | 100 | 100 | ○ | ○ |
| 10 | (1) | 85 | 80 | △ | X |
| 11 | (1) | 80 | 75 | △ | X |
| 12 | (1) | 100 | 95 | ○ | ○ |

Note:
[1]Vegetable oil (mold release agent).
[2]Mold rust inhibitor.
[3]Machine oil.
[4]Conveyor oil.
[5]Oily dirt, sweat, etc.
[6]"B" indicates that the coat suffered from blisters.

As evidently recognized from Table 4, the shaped articles treated by the method of the present invention can be provided with coats having excellent appearance, high adhesion and high gasoline resistance. In addition, the coats formed on the shaped articles treated by the method of the present invention do not suffer from defects such as blisters, etc.

As mentioned above, according to the method of the present invention, the shaped articles made of a polypropylene resin are degreased and deterged with an aqueous solution of a detergent composed of sodium carbonate and an ethylene oxide adduct of aryl- or aralkyl-substituted phenol. Since no organic solvent is contained in the detergent, there do not occur problems such as flammability, environmental pollution, etc. In addition, since the detergent does not contain phosphorus and nitrogen, no measure for preventing a nutrition-rich effluent is required, causing no environmental pollution. Furthermore, since the detergent has an excellent detergency for various kinds of contaminants, a treating time is considerably reduced.

The coats formed on the shaped articles which have been treated by the method of the present invention exhibit high adhesion as well as high gasoline resistance and blister resistance.

What is claimed is:

1. A method for treating a shaped article made of a polypropylene resin before coating, comprising the step of degreasing and deterging a surface of said shaped article with an aqueous alkaline solution comprising (a) 5–50 g/liter of a builder and (b) 1–10 g/liter of an ethylene oxide adduct of aryl- or aralkyl-substituted phenol at a temperature of 50°–70° C., said ethylene oxide adduct of aryl- or aralkyl-substituted phenol having a hydrophilic-lipophilic balance (HLB) of 8 to less than 12.

2. The method according to claim 1, wherein said polypropylene resin comprises a propylene homopolymer or a propylene copolymer, and additives selected from the group consisting of other polyolefins, thermoplastic elastomers and fillers.

3. The method according to claim 1, wherein said polypropylene resin comprises a propylene-ethylene random copolymer or a propylene-ethylene block copolymer.

4. The method according to claim 2, wherein said additives are selected from the group consisting of polyethylene, an ethylene-propylene copolymer rubber (EPR), an ethylene-propylene-diene copolymer rubber (EPDM), an ethylene-butene copolymer rubber (EBR) and inorganic fillers.

5. The method according to claim 1, wherein said aqueous alkaline solution further comprises a water-softening agent.

6. The method according to claim 1, wherein said builder is sodium carbonate.

7. The method according to claim 1, wherein said aqueous alkaline solution contains said builder in the proportion of 10–20 g/liter.

8. The method according to claim 1, wherein said aqueous alkaline solution contains said ethylene oxide adduct of aryl- or aralkyl-substituted phenol in the proportion of 3–6 g/liter.

9. The method according to claim 1, wherein said ethylene oxide adduct of aryl- or aralkyl-substituted phenol is a nonionic surface-active agent having an multi-nucleus hydrophilic group.

10. The method according to claim 1, wherein said ethylene oxide adduct of aryl- or aralkyl-substituted phenol is represented by the following formula:

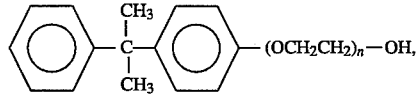

wherein n represents the number of moles of ethylene oxide added.

11. The method according to claim 10, wherein the number of said ethylene oxide added to the adduct of aryl- or aralkyl-substituted phenol is 3–8.

12. The method according, to claim 1 wherein said ethylene oxide adduct of aryl- or aralkyl-substituted phenol has a hydrophilic-lipophilic balance (HLB) of 9–11.

13. The method according to claim 1 wherein a molecular weight of said ethylene oxide adduct of aryl- or aralkyl-substituted phenol is in the range of from 300 to 1,000.

14. The method according, to claim 1 wherein a molecular weight of said ethylene oxide adduct of aryl- or aralkyl-substituted phenol is in the range of from 350 to 600.

15. The method according to claim 5, wherein said water-softening agent is an alkali metal salt of a carboxylic acid polymer.

16. The method according to claim 15, wherein said carboxylic acid polymer is a homopolymer of a monocarboxylic acid or a dicarboxylic acid or a copolymer of at least two of said carboxylic acids.

17. The method according to claim 16, wherein said monocarboxylic acid is selected from the group consisting of acrylic acid and methacrylic acid, said dicarboxylic acid is selected from the group consisting of maleic acid, fumaric acid and itaconic acid, and said copolymer is composed of at least two of said carboxylic acids.

18. The method according to claim 16, wherein said carboxylic acid polymer is a copolymer of acrylic acid and maleic acid.

19. The method according to claim 15, wherein said alkali metal salt is a sodium salt or a potassium salt.

20. The method according to claim 15, wherein a molecular weight of said alkali metal salt of a carboxylic acid polymer is 50,000–100,000.

21. The method according to claim 15, wherein a molecular weight of said alkali metal salt of a carboxylic acid polymer is 60,000–80,000.

22. The method according to claim 15, wherein said alkali metal salt of a carboxylic acid polymer is contained in the proportion of 0–5 g/liter.

23. The method according to claim 1, further comprising the step of subjecting said shaped article to a surface-conditioning process after the completion of said degreasing and deterging process.

24. The method according to claim 23, wherein a surface-conditioning agent used in said surface-conditioning process is an aqueous solution of polyoxyethylene-higher alcohol.

25. The method according to claim 24, wherein said aqueous solution of polyoxyethylene-higher alcohol is contained in said surface-conditioning agent in the proportion of 0.1–5 g/liter.

26. The method according to claim 24, wherein said aqueous solution of polyoxyethylene-higher alcohol is contained in said surface-conditioning agent in the proportion of 0.5–2.5 g/liter.

27. The method according to claim 24, wherein said aqueous solution of polyoxyethylene-higher alcohol has a hydrophilic-lipophilic balance of 12–16.

28. The method according to claim 24, wherein said polyoxyethylene-higher alcohol has a hydrophilic-lipophilic balance of 12–14.

29. The method according to claim 24, wherein said aqueous solution of polyoxyethylene-higher alcohol is obtained by adding 5–8 moles of ethylene oxide to one mole of a higher alcohol selected from the group consisting of lauryl alcohol, oleyl alcohol and sperm alcohol.

30. The method according to claim 24, wherein said polyoxyethylene-higher alcohol is a secondary, linear alcohol ethoxylate.

31. The method according to claim 1, wherein said degreasing and deterging process is carried out by a spraying method.

32. The method according to claim 23, wherein said surface-conditioning process is carried out by a spraying method.

33. The method according to claim 23, wherein the temperature of said surface-conditioning agent is 5°–60° C.

34. The method according to claim 23, wherein the temperature of said surface-conditioning agent is 30°–60° C.

35. The method according to claim 23, wherein said shaped article is coated with a primer after being subjected to said surface-conditioning process.

36. The method according to claim 1, wherein said ethylene oxide adduct is an ethylene oxide adduct of said aryl-substituted phenol.

37. The method according to claim 1, wherein said ethylene oxide adduct is an ethylene oxide adduct of said aralkyl-substituted phenol.

* * * * *